(12) United States Patent
Bedeau et al.

(10) Patent No.: US 9,950,582 B2
(45) Date of Patent: Apr. 24, 2018

(54) SUSPENSION STOP DEVICE

(71) Applicants: Charles Bedeau, Tours (FR); Sylvain Bussit, Monnaie (FR); Francois De Lemps, Saint-Cyr-sur-Loire (FR); Daniel Jansen, Schwebheim (DE); Bruno Montboeuf, Cerelles (FR); Jean-Marc Soudee, Chambray-les-Tours (FR)

(72) Inventors: Charles Bedeau, Tours (FR); Sylvain Bussit, Monnaie (FR); Francois De Lemps, Saint-Cyr-sur-Loire (FR); Daniel Jansen, Schwebheim (DE); Bruno Montboeuf, Cerelles (FR); Jean-Marc Soudee, Chambray-les-Tours (FR)

(73) Assignee: AKTIEBOLAGET SKF, Gothenburg (SE)

( * ) Notice: Subject to any disclaimer, the term of this patent is extended or adjusted under 35 U.S.C. 154(b) by 0 days.

(21) Appl. No.: 15/073,995

(22) Filed: Mar. 18, 2016

(65) Prior Publication Data
US 2016/0280027 A1    Sep. 29, 2016

(30) Foreign Application Priority Data

Mar. 24, 2015 (FR) ...................... 15 52433

(51) Int. Cl.
*B60G 11/22* (2006.01)
*B60G 15/06* (2006.01)
(Continued)

(52) U.S. Cl.
CPC ............ *B60G 11/22* (2013.01); *B60G 15/068* (2013.01); *F16C 19/163* (2013.01);
(Continued)

(58) Field of Classification Search
CPC  B60G 11/22; B60G 15/068; B60G 2204/125; B60G 2204/128;
(Continued)

(56) References Cited

U.S. PATENT DOCUMENTS 6,736,381 B2 * 5/2004 Chesne ............... B60G 15/063
267/220
2004/0104552 A1 * 6/2004 Nicot .................... B60G 17/04
280/124.155

(Continued)

FOREIGN PATENT DOCUMENTS

FR   2793732 A1   11/2000
FR   2847516 A1    5/2004
(Continued)

*Primary Examiner* — Melody M Burch
(74) *Attorney, Agent, or Firm* — Bryan Peckjian; SKF USA Inc. Patent Dept.

(57) ABSTRACT

A suspension stop device provides an upper contact cap, a lower support cap and at least one bearing arranged between the caps. The upper contact cap provides a centering portion for a damper pad, inside which the pad, which is external to the device, is intended to be mounted. The centering portion extends axially inside a bore in the lower support cap.

8 Claims, 2 Drawing Sheets

(51) Int. Cl.
  *F16C 19/16* (2006.01)
  *F16C 27/06* (2006.01)
  *F16F 1/36* (2006.01)
(52) U.S. Cl.
  CPC ...... *F16C 27/066* (2013.01); *B60G 2202/143* (2013.01); *B60G 2204/125* (2013.01); *B60G 2204/128* (2013.01); *B60G 2204/418* (2013.01); *B60G 2204/45021* (2013.01); *F16C 2326/05* (2013.01)
(58) Field of Classification Search
  CPC .... B60G 2204/418; B60G 2204/45021; B60G 2202/143; F16C 19/163; F16C 27/066; F16C 2326/05
  See application file for complete search history.

(56) References Cited

U.S. PATENT DOCUMENTS

2007/0255467 A1* 11/2007 Blanchin ............... B60C 23/061
　　　　　　　　　　　　　　　　　701/38
2008/0197552 A1* 8/2008 Winocur .............. B60G 15/068
　　　　　　　　　　　　　　　　　267/195

FOREIGN PATENT DOCUMENTS

| | | |
|---|---|---|
| FR | 2900368 A1 | 11/2007 |
| FR | 3003803 A1 | 10/2014 |
| WO | 01/92040 A1 | 12/2001 |
| WO | 2011/070117 A1 | 6/2011 |

* cited by examiner

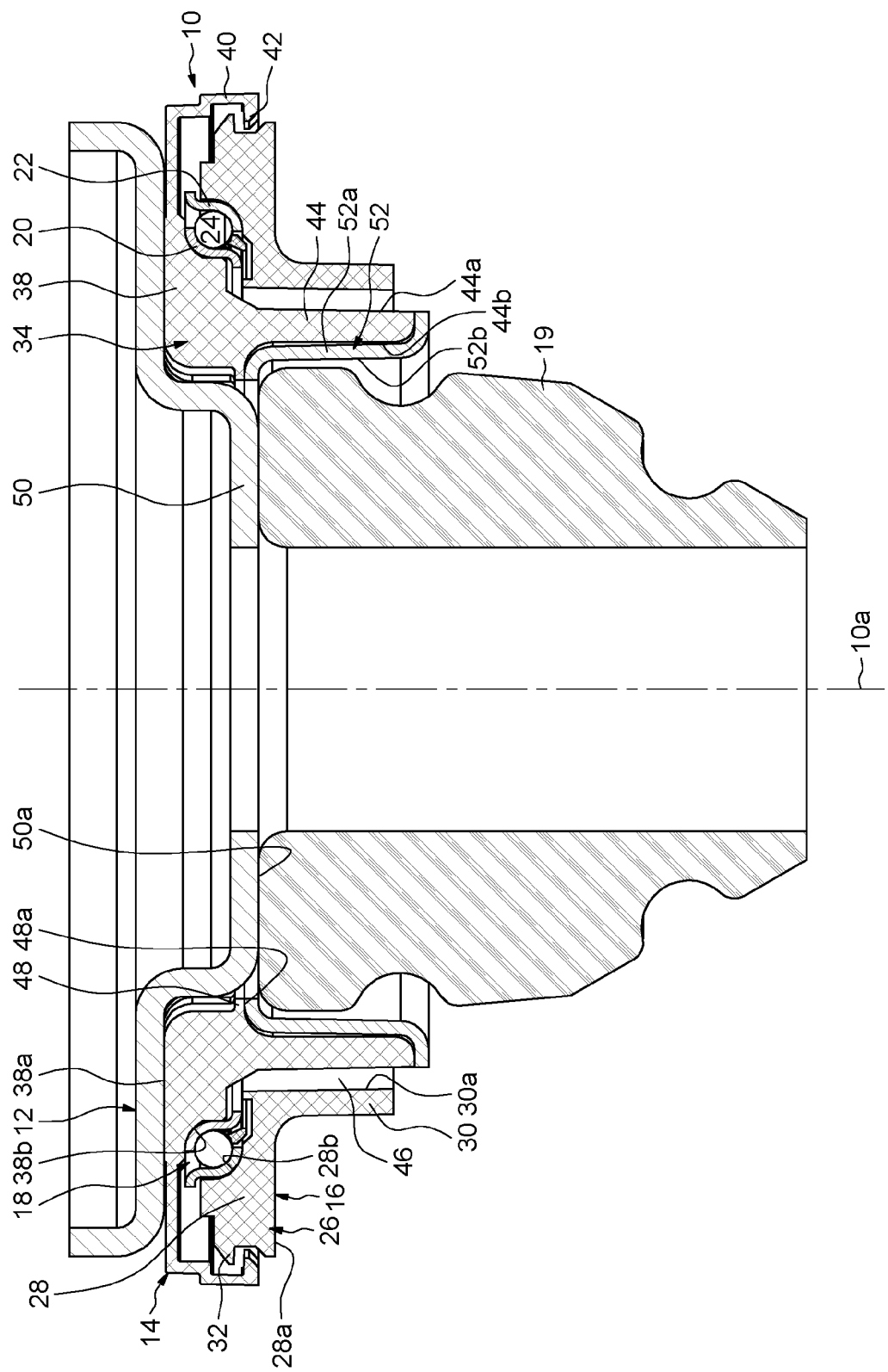

SUSPENSION STOP DEVICE

CROSS-REFERENCE TO RELATED APPLICATIONS

This is a Non-Provisional Patent Application, filed under the Paris Convention, claiming the benefit of French (FR) Patent Application Number 1552433, filed on 24 Mar. 2015, which is incorporated herein by reference in its entirety.

FIELD OF THE INVENTION

The present invention concerns the field of suspension stop devices used in particular for motor vehicles, in the suspension legs of the steered wheels.

BACKGROUND OF THE INVENTION

Such a suspension stop device generally provides a bearing forming an axial stop, and upper and lower caps forming a housing for the bearing races and allowing an interface between the races and the adjacent elements. The bearing may be of the oblique contact type to absorb both the radial forces and the axial forces exerted on the device.

The suspension stop device is generally arranged in the upper part of the suspension leg, between a suspension spring and an upper contact seat integral with the vehicle body. The suspension spring is mounted around a damper piston rod, the end of which is connected to the vehicle body. The suspension spring, of the coil spring type, comes to rest axially directly or indirectly on the lower cap of the suspension stop device. The stop device allows transmission of axial and radial forces between the suspension spring and the vehicle body, while allowing a relative rotational movement between the lower cap and the upper contact seat resulting from a deflection of the steered wheels of the vehicle and/or compression of the suspension spring.

In general, a damper pad, made for example of rubber or elastomer, is mounted around the piston rod and is housed in a bore in the lower cap of the stop device. Upon a shock on the suspension leg, the spring, the piston rod and the damper pad are compressed axially. The damper pad then exerts axial and radial forces on the lower cap of the stop device. For more details, see for example patent applications WO-A1-2011/070117 and FR-A1-3 003 803.

The suspension stop device described in these prior documents comprises a lower cap with good mechanical resistance to the forces exerted by the damper pad.

BRIEF SUMMARY OF THE INVENTION

However, the present invention aims to further improve the absorption of forces exerted by the damper pad during a shock on the suspension leg.

The present invention also aims to provide a suspension stop device of simple and economic design.

In one embodiment, the suspension stop device provides an upper contact cap, a lower support cap and at least one bearing arranged between the caps. The upper contact cap provides a centering portion for a damper pad, inside which the pad, which is external to the device, is intended to be mounted. The centering portion extends axially inside a bore in the lower support cap.

The arrangement of the centering portion, which accommodates the damper pad, on the upper contact cap allows better absorption of the forces, in particular radial forces, exerted by this pad insofar as the contact cap remains fixed even during deflection of the steered wheels. On the contrary, in the devices of the prior art, the damper pad is centered inside the lower support cap which is movable in rotation during such a deflection.

Also, with this arrangement, it is possible to absorb the axial forces exerted by the damper pad via the contact seat which is integral to the vehicle body, without transmitting these forces to the bearing.

The centering portion of the upper contact cap may extend axially inside a bore of an axial skirt of the lower support cap, the skirt being able to ensure the centering of a suspension spring which is external to the device.

In one embodiment, the centering portion of the upper contact cap extends axially protruding relative to a lower end rim of the lower support cap.

The upper contact cap may comprise at least one protrusion extending radially towards the inside from a bore of the centering portion, the protrusion comprising a lower contact face for the damper pad.

In one embodiment, the upper contact cap provides a reinforcement suitable for reinforcing the mechanical strength of the centering portion of the cap. The reinforcement may be embedded at least partly inside a body of the upper contact cap which provides the centering portion. Alternatively, the reinforcement is mounted radially in contact with a bore of the centering portion of the upper contact cap.

In one embodiment, the upper contact cap provides axial retention means cooperating with complementary axial retention means of the lower support cap. The device thus forms an assembly which can be manipulated, transported and mounted with limited risk of separation. Preferably, the retention means of the upper contact cap are arranged radially on the side opposite the centering portion of the cap relative to the bearing.

In one embodiment, the bearing is provided with a first race and a second race. The upper contact cap is mounted in contact with one of the races and the lower support cap is mounted in contact with the other race. The bearing may comprise at least one row of rolling elements arranged between the first and second races.

The invention also concerns a suspension leg comprising a suspension stop device as defined above, a contact seat in contact with an upper face of the upper contact cap of the device, and a damper pad arranged inside the centering portion of the upper contact cap and mounted axially in contact with the contact seat.

BRIEF DESCRIPTION OF THE SEVERAL VIEWS OF THE DRAWINGS

The present invention will be better understood from the detailed description below of embodiments given as non-limitative examples, illustrated by the attached drawings on which:

FIG. 2 is an axial section view of a suspension stop device according to a second exemplary embodiment of the invention.

DETAILED DESCRIPTION OF THE INVENTION

Figure 1:
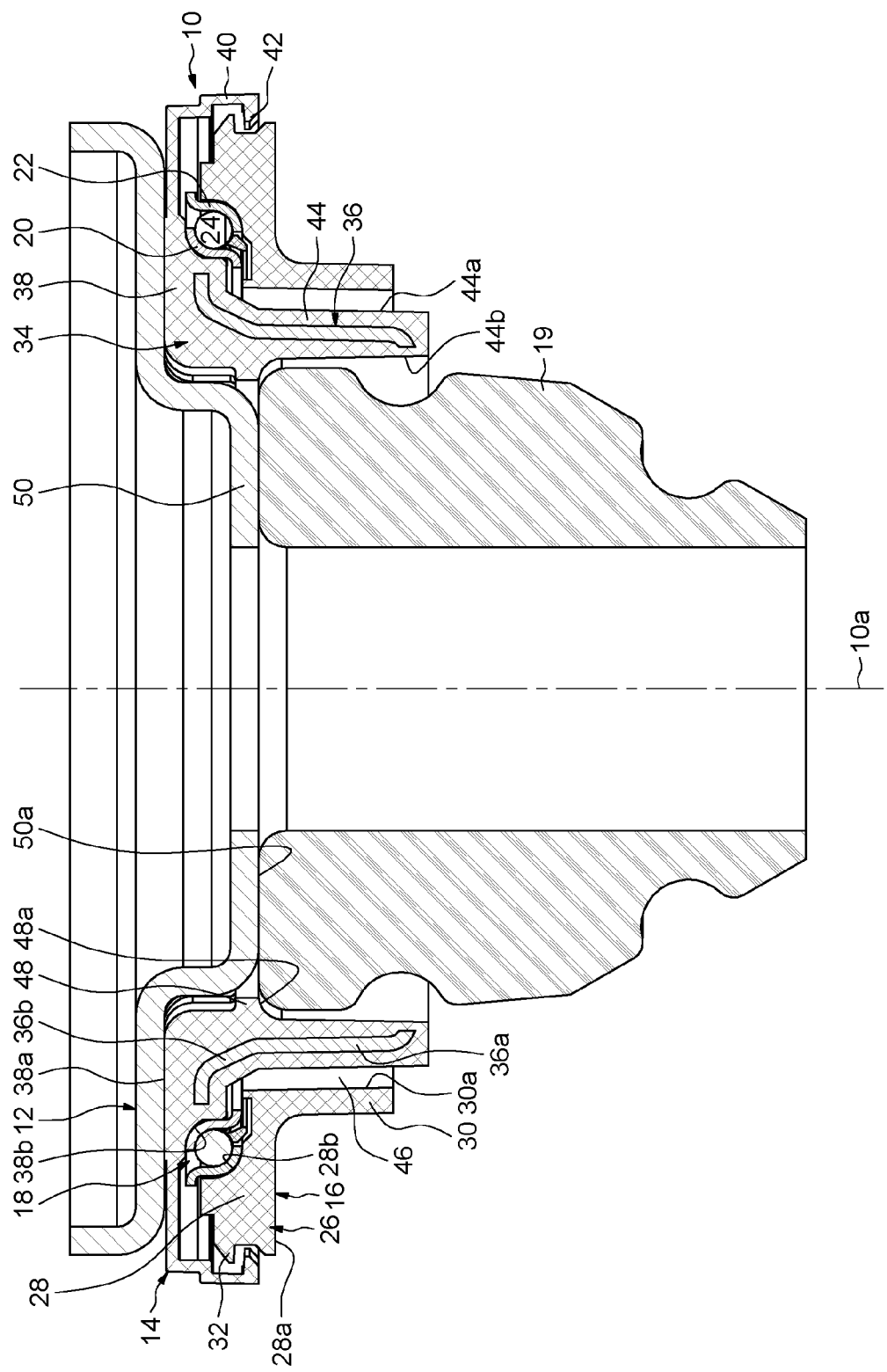
FIG. 1 is an axial section view of a suspension stop device according to a first exemplary embodiment of the invention.

On FIG. 1, a suspension stop device marked 10 as a whole is mounted between an upper cup or contact seat 12 which comes into contact with a fixed chassis element of a motor vehicle, and a suspension spring (not shown) of the coil spring type. The contact seat 12 and the suspension spring form part of the suspension leg associated with the device 10. On FIG. 1, the device 10 is shown in an approximately vertical position.

The device 10 of axis 10a provides an upper contact cap 14 which comes to rest against the upper contact seat 12, a lower support cap 16 forming a support means for the suspension spring, and a roller bearing 18 axially interposed between the caps and forming an axial stop.

As will be described in more detail below, the upper contact cap 14 is provided to allow the housing and centering of a damper pad 19. The damper pad 19 is mounted around the damper piston rod (not shown). The damper pad 19 is made of flexible material such as rubber or elastomer and has an annular form of axis 10a.

The bearing 18 is arranged between the upper contact cap 14 and the lower support cap 16, and mounted in contact with the caps. The contact cap 14 and support cap 16 are mounted in direct contact with the roller bearing 18 without the interposition of an intermediate element.

The bearing 18 of axis 10a provides an upper race 20 in contact with the upper contact cap 14, and a lower race 22 in contact with the lower support cap 16, between which a row of rolling elements 24 is housed, here in the form of balls. A cage (not shown) may also be provided to maintain a regular circumferential spacing between the rolling elements 24. The rolling elements 24 are arranged between the rolling tracks formed by the upper race 20 and lower race 22. Advantageously, these races may be produced from the same sheet metal flank by cutting and deep drawing.

The lower support cap 16 of axis 10a is produced integrally by moulding from a rigid synthetic material, for example polyamide. The synthetic material may contain glass fibres. The support cap 16 provides an annular body 26, provided with an annular radial portion 28 in the form of a plate and an annular axial skirt 30 which extends a rim of small diameter of the radial portion 28. The skirt 30 extends axially opposite the upper contact cap 14 and bearing 18. The radial portion 28 provides a lower annular radial surface 28a delimiting a contact surface for the top winding of the suspension spring, and an upper toroidal surface 28b in contact with the lower race 22 of the bearing and of complementary form. The skirt 30 allows centering of the suspension spring. This centering is achieved by the outer surface of the skirt 30. The skirt 30 delimits an axial bore 30a. The bore 30a partly forms the bore of the lower support cap.

The lower support cap 16 also provides a plurality of outer hooks 32 arranged on the outer surface of the body 26 and extending radially outward. The hooks 32 extend radially towards the outside in the direction of the upper contact cap 14. In the exemplary embodiment illustrated, the hooks 32 are arranged close to the upper end of the support cap 16. The hooks 32 are here spaced apart from each other in the circumferential direction, preferably regularly. Alternatively, the support cap 16 may comprise one annular inner hook, i.e. which is continuous in the circumferential direction.

In the exemplary embodiment illustrated, the upper contact cap 14 of axis 10a provides an annular body 34 and a reinforcement 36. The body 34 is produced by moulding from a synthetic material. The body 34 is here produced integrally.

The body 34 of the support cap provides an annular radial portion 38 and an annular axial outer skirt 40 which axially extends downward a rim of large diameter of the radial portion 38, and radially surrounds the lower support cap 16. The radial portion 38 provides an upper surface 38a axially in contact with the contact seat 12. Axially on the opposite side to the contact seat 12, the radial portion 38 delimits a lower toroidal surface 38b in contact with the upper race 20 of the bearing and of complementary form.

The body 34 also provides a plurality of inner hooks 42 arranged on the outer skirt 40 and extending radially inward. The hooks 42 extend from the bore of the outer skirt 40, radially inward in the direction of the lower support cap 16. The hooks 42 are arranged axially below the hooks 32 of the lower support cap, and have an inner diameter smaller than the outer diameter of the hooks 32, so as to be able to interfere diametrically with the hooks 32 in the case of relative axial displacement of the support cap 16 and the contact cap 14. The hooks 42 of the upper contact cap 14 form axial retention means cooperating with complementary axial retention means of the support cap 16 formed by the hooks 32. In the exemplary embodiment shown, the hooks 42 are spaced apart from each other in the circumferential direction, preferably regularly. Alternatively, the body 34 may comprise one annular inner hook, i.e. which is continuous in the circumferential direction.

The body 34 furthermore provides a tubular axial outer centering portion 44 which axially extends downward a rim of small diameter of the radial portion 38. The centering portion 44 extends axially into the bore of the lower support cap. The centering portion 44 extends axially into the bore 30a of the skirt 30 of the cap. The centering portion 44 and the skirt 30 are coaxial with axis 10a. The centering portion 44 extends axially protruding, here downward, relative to a lower end rim of the skirt 30 of the lower support cap, this rim forming the lower end rim of the cap. An annular radial space 46 is formed between the centering portion 44 of the upper contact cap and the skirt 30 of the lower support cap.

The centering portion 44 of the upper contact cap has an outer diameter which is smaller than the diameter of the contact zone of the bearing 18 on the lower support cap 16. The centering portion 44 is delimited in the radial direction by an annular axial outer surface 44a radially opposite the bore 30a of the lower support cap, and by an axial bore 44b. The centering portion 44 delimits on the inside a space for mounting the upper end of the damper pad 19. The damper pad 19 extends partly inside the space. This space is delimited radially by the bore 44b.

The body 34 also provides an annular protrusion 48 arranged on the centering portion 44 and extending inward. The protrusion 48 extends radially inward from the bore 44b of the centering portion. In the exemplary embodiment shown, the protrusion 48 is situated axially directly adjacent to the connection zone between the radial portion 38 and the centering portion 44 of the body 34. The protrusion 48 provides a lower radial contact surface 48a which is oriented axially towards the damper pad 19. In the exemplary embodiment shown, the protrusion 48 is annular in form, i.e. continuous in the circumferential direction. As a variant, the body 34 may comprise a plurality of protrusions spaced apart from each other in the circumferential direction.

The contact seat 12, which rests axially against the upper surface 38a of the upper contact cap, may for example be made of metal material. The contact seat 12 here has a stepped form. The contact seat 12 provides an annular radial portion 50 mounted in the bore of the upper contact cap. The radial portion 50 is here mounted in the bore 44b of the centering portion 44. The radial portion 50 provides a lower radial annular contact surface 50a, which serves for axial support of the damper pad 19. The contact surface 50*a* forms a lower surface of the contact seat 12.

Upon a shock on the suspension leg, the damper pad 19 is axially compressed against the contact seat 12. Under the effect of this axial compression, the damper pad 19 deforms radially outward and exerts radial forces on the centering portion 44 of the upper contact cap, which are then transmitted to the contact seat 12. The axial forces generated by the axial crushing of the damper pad 19 are transmitted to the contact seat 12. After deformation, the damper pad 19 comes to rest axially against the lower radial surface 48*a* of the protrusion 48 of the upper contact cap. A part of the axial forces is transmitted to the contact seat 12 via the upper contact cap 14.

In the exemplary embodiment shown, in the uncompressed state of the damper pad 19, there is a slight radial play between the pad and the bore 44*b* of the centering portion of the upper contact cap. On axial compression of the damper pad 19, the pad comes radially into contact with the bore 44*b*. The bore 44*b* forms an inner axial contact surface for the damper pad 19. As a variant, the diameter of the bore 44*b* of the centering portion 40 may be reduced, so as to achieve a radial contact between the bore 44*b* and the damper pad 19 in the unstressed state of the pad. In this case, an axial contact may also exist between the protrusion 48 of the upper contact cap and the damper pad 19 in the unstressed state of the pad.

In the exemplary embodiment shown, the upper contact cap 14 provides the reinforcement 36 to reinforce the mechanical strength of the centering portion 44 of the cap. The reinforcement 36 is fully embedded inside the body 34. The body 34 is over-moulded over the reinforcement 36. The reinforcement 36 here extends axially inside the centering portion 44 and the radial portion 38 of the upper contact cap. The reinforcement 36 provides an annular axial portion 36*a* extending inside the centering portion 44, which is extended at an upper end by a frustoconical portion 36*b* extending both inside the centering portion and inside the radial portion 38.

The exemplary embodiment shown in FIG. 2, on which identical elements carry the same references, differs from the first example described only in that the upper contact cap 14 provides a reinforcement 52 mounted in the bore 44*b* of the centering portion of the upper contact cap. The reinforcement 52 here takes the form of a cup. The reinforcement 52 is mounted radially resting against the bore 44*b*. The reinforcement 52 is mounted axially resting against the protrusion 48. The reinforcement 52 is fixed to the upper contact cap 14 by any suitable means, for example by gluing. The reinforcement 52 is interposed between the body 34 of the contact cap and the damper pad 19. In a manner similar to the first example described, the reinforcement 52 is intended to reinforce the mechanical strength of the centering portion 44 of the contact cap. In this exemplary embodiment, the reinforcement 52 provides an annular axial portion 52*a* which rests radially against the bore 44*b* of the centering portion 44 and which is extended at each end by a curved part, conforming respectively to the lower end rim and to the protrusion 48 of the contact cap. The reinforcement 52 delimits a bore 52*b* for mounting the damper pad 19.

In this exemplary embodiment, the damper pad 19 is inserted in the reinforcement 52 of the support cap which is itself mounted inside the centering portion 44 of the cap. The damper pad 19 is mounted in the centering portion 44 with the interposition of the reinforcement 52. The contact between the damper pad 19 and the body 34 of the upper contact cap is indirect. This contact takes place via the reinforcement 52.

As indicated above in the exemplary embodiments shown, the upper contact cap 14 provides a reinforcement 36, 52 so as to improve the mechanical strength of the centering portion of the cap against the radial forces exerted by the damper pad. As a variant, a contact cap may be provided without such reinforcement.

In another variant embodiment, the centering portion 44 or the reinforcement 52 of the contact cap may comprise an axial retention means for the damper pad, which may for example be formed by an annular radial shoulder provided in the bore of the portion or the reinforcement.

Thanks to the invention, a stop device is provided in which the centering portion, inside which the damper pad extends, is provided on the upper contact cap which is integral with the body of the vehicle, ensuring a good absorption of the forces exerted by this pad.

The invention has been illustrated on the basis of a suspension stop device comprising a roller bearing provided with a first race, a second race and at least one row of rolling elements arranged between the races. As a variant, the bearing may be of the plain type and comprise an annular body, made for example from a thermoplastic material, and may comprise radial grooves able to be filled with a lubricant. In another variant, the plain bearing may comprise two tracks or races directly sliding on each other.

The invention claimed is:

1. A suspension stop device for a suspension leg, comprising:
   an upper cup having an annular radial portion that, viewed in cross section, defines a radially extending axial surface configured to abut and directly contact a damper pad,
   the damper pad being configured to axially compress against the radially extending axial surface of the annular radial portion of the upper cup in response to shock to the suspension leg, the damper pad having a damper pad outer surface,
   an upper contact cap abutting the upper cup, the upper contact cap having a radially inwardly extending protrusion,
   a lower support cap configured to contact a suspension spring,
   at least one bearing arranged between the upper contact cap and the lower support cap, wherein the upper contact cap provides a centering portion for the damper pad which is mounted inside the centering portion, the centering portion extending axially inside a lower support cap bore, the centering portion of the upper contact cap defining a centering portion inner surface defining an upper contact cap bore in which the damper pad is received, the upper contact cap bore being configured such that when the damper pad is not axially compressed there is a gap between the damper pad outer surface and the centering portion inner surface without another component therebetween such that when the damper pad is axially compressed the damper pad outer surface can contact the centering portion inner surface, the radially inwardly extending protrusion of the upper contact cap not extending between the damper pad and the radially extending axial surface of the upper cup, and
   wherein the radially inwardly extending protrusion is configured such that when the damper pad is axially compressed the damper pad comes into contact with the radially inwardly extending protrusion and part of the force transmitted to the upper cup is transmitted via the upper contact cap.

2. The suspension stop device according to claim 1, wherein the centering portion of the upper contact cap extends axially inside a bore of an axial skirt of the lower support cap, the skirt being able to ensure the centering of a suspension spring which is external to the device.

3. The suspension stop device according to claim 1, wherein the centering portion of the upper contact cap extends axially protruding relative to a lower end rim of the lower support cap.

4. The suspension stop device according to claim 1, wherein the radially inwardly extending protrusion extends towards the inside from the upper contact cap bore, the radially inwardly extending protrusion having a lower contact face for the damper pad.

5. The suspension stop device according to claim 1, wherein the upper contact cap includes a reinforcement suitable for reinforcing the mechanical strength of the centering portion of the cap.

6. The suspension stop device according to claim 5, wherein the reinforcement is embedded at least partly inside a body of the upper contact cap which provides the centering portion.

7. The suspension stop device according to claim 1, wherein the upper contact cap provides axial retention means cooperating with complementary axial retention means of the lower support cap.

8. The suspension stop device according to claim 7, wherein the retention means of the upper contact cap are arranged radially on the side opposite the centering portion of the upper contact cap relative to the bearing.

* * * * *